United States Patent [19]
Martin et al.

[11] Patent Number: 5,762,008
[45] Date of Patent: Jun. 9, 1998

[54] BURNING FUELS, PARTICULARLY FOR INCINERATING GARBAGE

[75] Inventors: Johannes Josef Edmund Martin; Joachim Horn, both of Munich; Michael Busch, Rosenheim, all of Germany

[73] Assignee: Martin GmbH fuer Umwelt- und Enetgietechnik, Munich, Germany

[21] Appl. No.: 437,785

[22] Filed: May 9, 1995

Related U.S. Application Data

[63] Continuation-in-part of Ser. No. 229,919, Apr. 19, 1994, abandoned.

[30] Foreign Application Priority Data

Apr. 20, 1993 [DE] Germany .............. 43 12 820.3

[51] Int. Cl.⁶ .................................... F23J 11/00
[52] U.S. Cl. .............. 110/345; 110/348; 110/204; 110/248; 110/300
[58] Field of Search ................... 110/348, 345, 110/346, 203, 204, 245, 248, 205

[56] References Cited

U.S. PATENT DOCUMENTS

| | | | |
|---|---|---|---|
| 5,241,916 | 9/1993 | Martin | 110/204 X |
| 5,307,746 | 5/1994 | Khinkis et al. | 110/345 X |
| 5,405,537 | 4/1995 | Goff et al. | 110/346 X |

*Primary Examiner*—Henry A. Bennett
*Assistant Examiner*—Susanne C. Tinker
*Attorney, Agent, or Firm*—McAulay Fisher Nissen Goldberg & Kiel, LLP

[57] ABSTRACT

A method for burning fuels, particularly garbage, in incinerators with a stoker grate, for which the primary air is supplied below the stoker grate into the fuel layer and the secondary air is supplied above the fuel layer, is controlled in such a way that the intensity of the combustion of the fuel on the stoker grate is increased by increasing the oxygen content of the primary air and the intensity of the combustion in the secondary combustion zone is choked by decreasing the oxygen content in the secondary air. Flue gas, preferably from the combustion process, is recirculated in order to reduce the oxygen content of the secondary air.

20 Claims, 10 Drawing Sheets

FIG. 1

BURNING FUELS, PARTICULARLY FOR INCINERATING GARBAGE

CROSS-REFERENCE TO RELATED APPLICATIONS

This is a continuation-in-part application based on parent application Ser. No. 08/229,919, filed Apr. 19, 1994 now abandoned.

BACKGROUND OF THE INVENTION a) Field of the Invention

The invention relates to a method for burning fuels, particularly for incinerating garbage, in incinerators with a stoker grate, for which the primary air is supplied into the fuel layer below the stoker grate and the secondary air is supplied above the fuel layer.

b) Background Art

In conventional combustion processes, a surface temperature of the fuel of 500° C. to 800° C. is reached, while the temperature in the secondary combustion zone is in the range of 900° C. to 1,300° C.

Methods of the above-described general type have been known for a long time.

Because of political objectives, garbage must be incinerated so that contamination of the environment is largely avoided. The previously customary procedure for achieving this objective is the optimization of the incinerating process on the stoker grate by supplying combustion air selectively with respect to amount and distribution along the stoker grate and also in the region of the secondary combustion zone, as well as by the use of constantly more extensive and more expensive facilities for downstream gas cleaning. Admittedly, this has already led to drastic reductions in emissions from such systems. However, it also brings about a great increase in the disposal costs, which are associated with the operation of these systems and an out-of-proportion expansion of the gas cleaning section compared to the conventional part of the facility consisting of the furnace and the energy utilization, such as the generation of steam. In the meantime, a standard has been attained for flue gas cleaning systems, which permits further improvements in the deposition performance to be anticipated only if very high additional costs are accepted, since cleaning efficiencies of 99% are being attained. Experience has shown that there is an exponential relationship between expenditure and cleaning performance, so that technical exertion no longer is justifiable for increasing the cleaning efficiency further. With the presently known measures, the technically justifiable limit of cleaning flue gases has been reached. Particularly in recent years, additional attempts have been made to achieve further improvements by modifying the combustion process.

From the disclosure of DE 39 15 992 A1, it is known how the formation of nitrogen oxides can be prevented, in order to make possible therewith savings in downstream cleaning systems. The basic principle of this known method consists primarily of modifying the oxygen content of the primary air by admixing recirculated flue gases from the combustion process, so that the combustion on the grate proceeds in a damped form with the objective of keeping the temperature at the tips of the flame below 1300° C., because it is known that the formation of the nitrogen oxide sets in to a greater degree above this temperature. For this known method, the secondary air is introduced in two stages, one above the other. In the lower stage, essentially recirculated flue gas is introduced, in order to generate a turbulence, while air from the surroundings is supplied to the second stage, in order to achieve the necessary combustion of the flue gases. In the case of the selectively retarded combustion reactions, however, there is a distinct deterioration in the ignition of solid garbage components on the incinerator grate. As a direct consequence, the proportion of uncombusted materials in the combustion residue increases and there is a greater possibility that pollutants will be bound in the residue, that is, in the ash, because of the lower combustion bed temperatures. Admittedly, the proportion of nitrogen oxides is reduced by this method. However, the proportion of uncombusted pollutants is increased because of the decrease in the oxidation potential.

For a different known method described in DE 40 27 908 A1, the proportion of oxygen in the primary combustion air as well as in the secondary combustion air is varied, this variation extending from an increase in the proportion of oxygen above that of the surrounding air to a decrease in the proportion of oxygen below that of the surrounding air. For this purpose, the oxygen, obtained in an air fractionation plant and the nitrogen, also obtained there, are used in order to increase the proportion of oxygen in the combustion air by supplying oxygen and to decrease the proportion of oxygen in the combustion air by supplying nitrogen. This procedure can improve the course of the combustion in important areas of the furnace or the combustion chamber. However, it does not lead to a decrease in the amount of flue gas flowing through the installation as a whole and especially also not in the amount of gas flowing through the flue gas cleaning system.

Until now, the concentration of pollutants in the flue gas has generally been the starting point for evaluating the relevance of garbage incinerators to the environment. The presently valid emission guidelines, namely the 17. Bundesimissionsschutzverordnung (17th Federal Emission Protection Regulation) of Germany or the EC Guidelines for Incinerating Garbage, as well as the Provisional Regulations hereto, govern the conditions imposed on such installations by limiting concentration values. This mode of consideration reflects the pollutants emitted into the environment only incompletely, since only relative and not actual amounts, which leave an emission source, can be identified. On the other hand, the evaluation of the pollutant loading describes the ecological significance of an emission source more comprehensively.

Experience from operating modern flue gas cleaning systems show that the attainable concentrations of pollutants and purified gas practically do not depend any more on the concentrations of pollutants in the flue gas entering the cleaning system. Instead, the concentrations at the end of the flue gas cleaning remain constant. This is explained by the exponential relationship, already alluded to above, between the degree of deposition and the expenditure for or the dimensioning of aggregates to be used.

OBJECTS AND SUMMARY OF THE INVENTION

It is therefore an object of the invention to achieve a significant decrease, beyond the previously obtained findings with respect to the attainable cleaning efficiencies, in the pollutant loading emitted to the environment, with a higher technical efficiency and smaller dimensioning of the aggregates connected downstream from the incineration.

Pursuant to the invention, this objective is accomplished, starting out from a method of the initially mentioned type for combusting fuels, owing to the fact that the combustion intensity of the fuel on the stoker grate is increased at least partially by increasing the proportion of oxygen in the primary air and that the combustion intensity in the secondary combustion zone is choked by decreasing the proportion of oxygen in the secondary air. Preferably, flue gas recirculated from the combustion process is used to decrease the proportion of oxygen in the secondary air.

It can be seen already from the temperature data that, compared with the previously known process, the surface temperature of the fuel is increased from the former range of 500° C.–800° C. to 800° C.–1,200° C. by increasing the oxygen proportion, while the previous conventional temperature range of 900° C.–1,300° C. is decreased to 800° C.–1,100° C. by reducing the oxygen proportion in the secondary combustion zone. These temperature data show that the combustion intensity of the fuel on the combustion grate is substantially increased compared to the previously known process and the combustion intensity in the secondary combustion zone is reduced compared to the previously known process.

The increase in the proportion of oxygen in the primary combustion air depends on the reaction zones, that is, on whether it is the warming-up zone, the main combustion zone or the final combustion zone. Due to this partly significant increase in the proportion of oxygen in the primary combustion air, the proportion of nitrogen is necessarily decreased. As a result, the intensity of the combustion is increased significantly and the volume of air required is decreased greatly, since the nitrogen content, which acts only as a ballast, is decreased. With that, there are already significant savings in the volume of combustion air required. These savings make it possible not only to reduce the dimensioning of the primary air blower and ducts, but also to decrease in size the downstream aggregates, such as the steam generator, the flue gas cleaning facility, the induced-draft blower and the chimney. The appreciable increase in the intensity of the primary combustion usually leads to an increase in the temperature of the combustion bed on the combustion grate and of the flame in the secondary combustion zone. The higher combustion bed temperatures have the advantageous effect of an improved total combustion of the solid parts of the fuel and an improved tying up of the pollutants in the ash because of sintering. On the other hand, the higher temperature of the secondary combustion results in the increased formation of nitrogen oxides (thermal $NO_x$). In the case of the known method, which has been mentioned above, the combustion process is choked appreciably for this reason already on the stoker grate. The invention thus initially follows a path, which should be regarded as in the wrong direction according to previous findings, in that the combustion initially is fanned beyond the usual extent on the stoker grate, in order to achieve thereby a considerable reduction in the amount of primary air, an improvement in the ash quality and a decrease in the combustible, that is, oxidizable pollutants, and then corrects this path in the secondary combustion zone, so that there is no increased formation of nitrogen oxides, the removal of which would entail a considerable expense. The further measure of the invention thus takes place here. This measure consists of choking the combustion process above the combustion layer at the start of the secondary combustion zone so that the formation of nitrogen oxides, which usually occurs, does not take place or takes place only to a greatly reduced extent. This damping measure thus commences at a point in time at which the elimination of oxidizable pollutants is already largely concluded due to the strongly fanned combustion process. Because the oxygen content of the primary air has been increased greatly, this air still contains enough oxygen after passing through the combustion layer so as to make the desired, throttled combustion in the secondary combustion region possible. This throttled combustion is to be controlled so that those temperatures at which nitrogen oxides are formed, do not arise. Pursuant to the invention, preferably flue gas from this combustion process is used to achieve the choking. Flue gas, the oxygen content of which is greatly reduced, is used in the inventive method to dampen the after-burning. Due to the use of flue gas, it is thus no longer necessary to supply additional, oxygen-deficient gas or inert gas. For this reason, the amount of gas does not have to be increased despite adequate combustion in the secondary combustion region, whereas it does have to be increased in the case of the previously known method, for which additional combustion air, in the form of air from the environment, was supplied over secondary air nozzles in the region of the secondary combustion zone. Even in the case of methods for which no pure combustion air was supplied, the amount of gas was nevertheless increased, because a mixture of the surrounding air and flue gas or an inert gas, such as nitrogen, was supplied, which increased the total amount of gas. The damping measures in the secondary combustion zone are thus produced for the present invention preferably with the help of flue gases, which arise during the primary combustion, that is, during the combustion of the combustion layer on the stoker grate, so that additional amounts of gas either are no longer required or are required to a lesser extent.

Modern garbage incinerators usually are operated with a division of the combustion air into 65% primary air and 35% secondary air. If, for example, the entire secondary air is replaced by recirculated gas in order to achieve the desired damping of the combustion process in the secondary combustion zone, then 35% of the total amount of gas flowing through the installation is saved by this measure. Together with the measure of increasing the oxygen content of the primary air, the amount of gas flowing through the downstream aggregates can be reduced by these means by two thirds. However, if, as noted above, the concentrations of the pollutants at the end of the flue gas cleaning system are independent of the inlet pollutant concentrations, the amount of pollutants arising, that is, the amount of pollutants emitted from one source, can be decreased by the reduction in the total gas volume by up to two thirds compared to previously operated plants in a manner that was not possible by means of the traditional mode of operating incinerators because of the exponential increase in costs mentioned above.

Starting out from the general, basic teachings explained above, a special further development of the invention consists therein that the oxygen content of the primary air is increased locally, above the oxygen content of the surrounding air, as a function of the combustion behavior or the burning intensity of the fuel layer on the stoker grate, that the oxygen content of the secondary air is decreased below the oxygen content of the surrounding air by admixing recirculated flue gas, and that the secondary air is adjusted locally with respect to the composition, the amount, the supplying site and a high turbulence in the secondary combustion zone, so that the formation of nitrogen oxides above the fuel layer is largely avoided. By adaptation to the local circumstances, that is, by taking into consideration the different states of the fuel along the stoker grate, the primary air can be adapted to the particular circumstances and adjusted so that the desired, intensified combustion effect and, with that, the combustion of oxidizable pollutants takes place. For this purpose, for example, known thermocouple elements are used to measure the temperature or infrared cameras are used to determine the solid-state radiation which is emitted directly from the combustion layer and permits conclusions to be drawn concerning the temperature of the combustion bed, that is, the temperature of the fuel mass in the process of combustion, in order to adjust the oxygen percentage. This is necessary to bring about a greater combustion intensity, at the particular site in the combustion grate, which is possible, for example, by appropriately subdividing the underblast guiding system for the combustion grate. For this purpose, the disclosure in DE 38 25 931 C2 makes a relevant proposal. In this connection, what is of decisive importance is not the known fact that the percentage of oxygen basically can be controlled, but rather that the oxygen percentage is increased in the case of the present invention to such an extent, that a combustion intensity and the decrease in oxidizable pollutants associated therewith is attained, which previously was not pursued because of the anticipated disadvantages. These disadvantages, which are to be seen, for example, in the thermal formation of nitrogen oxides and in the overheating of the protective lining of the combustion chamber, are, however, avoided in the case of the present invention owing to the fact that selective damping measures with respect to the temperature development and the adjustment of other conditions are initiated over the combustion layer, so that the anticipated disadvantages do not occur. These damping measures include basically the reduction in the oxygen percentage, as was already explained further above. In this connection, the amounts of secondary air and the place in relation to the combustion layer or the combustion chamber and the turbulence, with which the amount of gas referred to as secondary air is supplied over the secondary air nozzles, are of great importance. The generation of a high turbulence has a particularly advantageous effect, since a frequently nonuniform distribution of oxygen is levelled out by these means and the oxygen that is present can be utilized better. As a result, the desired course of the combustion can be achieved at relatively low temperatures in the secondary combustion region. It is possible to adjust the conditions in the secondary combustion region with the help of temperature measurements and observations by means of infrared cameras or of flame monitors in such a manner, that temperatures harmful for the lining of the combustion chamber as well as for the formation of nitrogen oxides are prevented, since it is known, for example, that a temperature of 1,300° C. represents a limiting value, above which increased formation of nitrogen oxides must be expected.

Depending on the type of material to be combusted, it may be advantageous to increase the oxygen content of the primary air only in the main combustion zone of the stoker grate, because the fuel in other regions initially is preheated or already has too low a calorific value, as is the case, for example, in the final combustion zone.

The oxygen content of the primary air, which can be adjusted locally differently in relation to the length of the combustion segment on the stoker grate, can be adjusted to a value of 25 to 50% by volume and preferably of 35% by volume. By these means, the amount of primary air can be reduced in accordance with a diagram, which is explained in greater detail below and is referred to as FIG. 2.

Since the combustion intensity on the stoker grate within the primary combustion zone can be increased particularly greatly pursuant to the present invention, sufficient oxygen for the secondary combustion still remains in the air that has passed through the combustion layer, so that, pursuant to a further development of the invention, the flue gases, in the secondary combustion zone, constitute 20% to 65% and preferably 35% of the total amount of air and gas supplied to the combustion process. For example, the total amount of gas, which is introduced through the secondary air nozzles, may consist of recirculated flue gas if it is assumed that preferably 35% of the total amount of air and gas is used as recirculated flue gas and that the secondary air constitutes 35% of the total amount of gas. Since it is a question of recirculated flue gas, more than a third of the total amount of gas is saved by this method.

Preferred parameters for controlling the oxygen content are, in relation to the primary combustion air, the surface temperature of the material being combusted and, in relation to the secondary air, the temperature existing in the secondary air combustion zone or the length of the flame in the vertical direction in the combustion chamber.

The recirculated flue gas is preferably exhausted after it has passed through the boiler. As a result, the decrease in the volume of gas, arising out of the recirculation of the flue gas, becomes noticeable only in the flue gas cleaning system. In particular situations, it may also be possible to exhaust the recirculated flue gas directly above the combustion layer.

The adjustment of the oxygen content of the primary air and, with that, the deliberate increase in the combustion intensity in the primary combustion zone can be advanced so far without regard to the later consequences, which are eliminated by the inventive damping measures, that the combustion process on the stoker grate is limited essentially by conditions which arise out of the operating ability of the combustion grate. An increase in the temperature of the combustion layer by up to 300° C. above that of conventional combustion processes is possible. Since the combustion bed temperature can be up to 300° C. higher than in the case of a combustion with normal outside air, the pollutants are bound into the ash to a higher degree. The thus decreased leachability of the pollutants improves the possibility of using the ash as a building material or lowers the requirements that a residue garbage dump must meet.

Basically, various important advantages arise out of enriching the oxygen content of the primary combustion air. It has already been emphasized in detail that the total amount of gas volume can be reduced up to two thirds, as a result of which a smaller dimensioning of the installation as a whole and, with that, a considerable reduction in costs arise. Due to the increase in the oxygen content in the primary air, there necessarily is a drastic reduction in the percentage of nitrogen supplied. This nitrogen is to be regarded merely as ballast and, in the past, reduced the thermal efficiency considerably. This effect of reducing the thermal efficiency decreases correspondingly due to the decrease in the percentage of nitrogen, so that the thermal efficiency is improved. The increase in the percentage of oxygen has its limits where a thermal overloading of the individual grate elements could occur. In practice, it has turned out that the percentage of oxygen can constitute up to 50% by volume of the primary air supplied without damage to the grate elements. By decreasing the volume flow of gas, the entraining effect on light and small garbage particles is reduced, so that these burn on or immediately above the grate and do not reach the cleaning system as uncombusted parts. Dust precipitators, in addition to the possible reduction in size due to the lower volume of flue gas, can therefore also be dimensioned smaller. The clearly more intensive combustion resulting from the invention does not only lead to higher temperatures of the fuel particles on the grate itself, but also brings about an increase in the gas temperatures immediately above fuel layer, which leads to a decrease in the concentrations of carbon monoxide and residual hydrocarbons. Furthermore, the concentration of the so-called precursor compounds is lowered, which in the region of the later cooling of the combustion gases can lead to the formation of dioxins and furans.

Due to the drastic choking of the combustion process in the secondary combustion region preferably by recirculating flue gas, disadvantages are avoided, which have arisen above the grate due to the previous oxygen enrichment. By supplying air from the environment to the secondary combustion region, overheating has been detected in this region. The result is expressed in a higher percentage of thermally formed nitrogen oxides and a long-term, unavoidable destruction of the protective ceramic lining of the combustion chamber region. These disadvantages are avoided by drastically choking the course of the combustion above the combustion layer, that is, in the secondary combustion region. The thorough mixing, required in the secondary combustion region in order to avoid an oxygen concentration gradient between recirculation gas and combustion gas from the primary combustion zone, is achieved by supplying the recirculation gas to the secondary combustion zone, the amount of gas supplied here being sufficient for ensuring the required turbulence. The lesser swirling up of dust in and above the combustion layer leads, in addition to the already mentioned smaller design of the dust filters, also to less contamination of the heating surfaces in the boiler and thus also to more favorable operating conditions with respect to boiler availability, elapsed time between two heating-surface cleanings and boiler efficiency. Due to the greatly reduced amount of gas while the amount of fuel is kept constant, there is necessarily a proportional increase in the concentration of the different pollutants, which are to be deposited by the flue gas cleaning system. This is evident from the diagrams in FIGS. 3 to 6. In the event that valuable materials are to be recovered in the flue gas cleaning process, the effectiveness and costs of this process are distinctly improved, for example, for the recovery of hydrochloric acid and gypsum from precipitated pollutants.

The invention is explained in the following by way of example by means of a furnace for carrying out the method in conjunction with drawings and diagrams, which show various experimental results.

DESCRIPTION OF THE PREFERRED EMBODIMENTS

Figure 1:
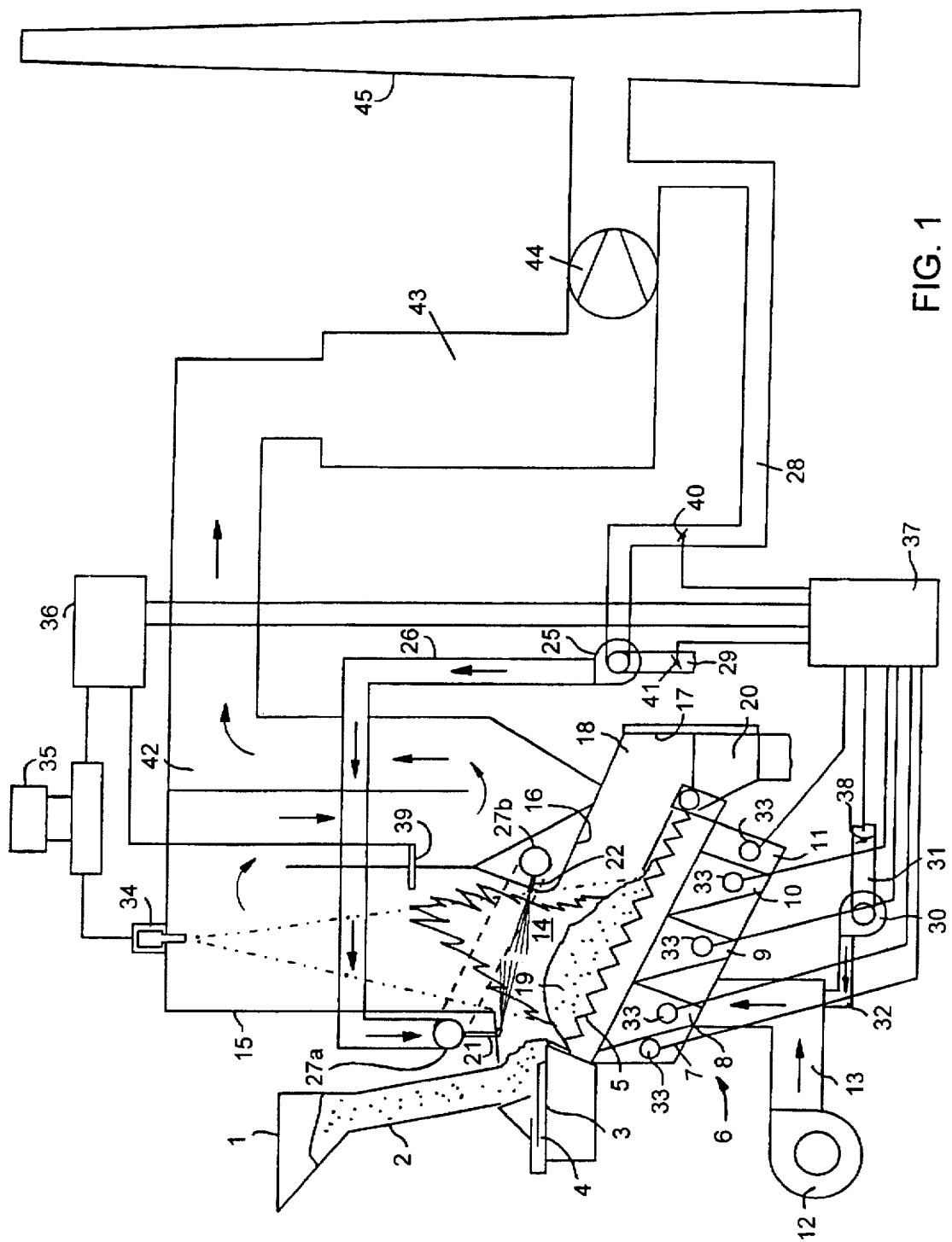
FIG. 1 shows a longitudinal section through a furnace.

As is evident from the drawing, a furnace for carrying out the method described has a charging hopper 1 with connecting charging chute 2 for charging the material to be burned on a charging table 3, on which charging rams 4, which can be moved back and forth, are provided, in order to feed the material to be burned and coming from the charging chute to a stoker grate (or combustion grate) 5, on which the combustion of the material takes place. It is immaterial here whether the grate is inclined or horizontal, no matter what principle is involved.

Below the stoker grate 5, facilities for supplying primary combustion air are disposed. These facilities, as a whole, are labeled 6 and can comprise several chambers 7 to 11, to which primary combustion air is supplied over a pipeline 13 by means of a fan 12. Due to the arrangement of the chambers 7 to 11, the stoker grate is divided into several underblast zones, so that the primary combustion air can be adjusted differently depending on the requirements on the stoker grate. Depending on the width of the stoker grate, the underblast zones can also be divided in the transverse direction, so that the supply of primary air can be controlled depending on local circumstances.

The combustion chamber 14 is located above the combustion (stoker) grate 5, its upper portion passing into a flue gas flue 15 to which is connected a waste heat boiler 42, a flue gas cleaning installation 43, an induced draft ventilator 44 and a flue gas flue or chimney 45. In the rear region, the combustion chamber 14 is defined by a cover 16, a rear wall 17 and side walls 18.

The combustion of the fuel designated by 19 is effected on the front part of the combustion grate 5, the flue gas flue 15 being located above the latter. In this region, most of the primary combustion air is fed by means of chambers 7, 8 and 9. Only spent fuel, i.e., ashes, is located on the rear part of the combustion grate 5 and primary combustion air is supplied to this region via chambers 10 and 11 substantially only to cool these ashes.

The spent fuel then falls into an ash discharge unit 20 at the end of the combustion grate 5. Rows of secondary air nozzles 21 and 22 which feed secondary combustion air to the ascending flue gas are provided in the lower region of the flue gas flue 15 in order to bring about secondary combustion of the combustible components contained in the flue gas.

The secondary air nozzle rows 21 and 22 are connected to air collectors 27a and 27b which are fed, via a pipeline 26, by a fan 25 which sucks in waste gas from a portion of the combustion installation located farther downstream via a pipeline 28 and, when appropriate, surrounding air via a pipeline 29. As is shown in FIG. 1, the flue gas can be removed before reaching the flue gas flue 45 and from a unit located farther upstream, e.g., the waste gas cleaning installation 43 or the draw-off boiler 42.

Either pure oxygen or oxygen-enriched surrounding air is sucked in from an air separation installation (not shown) via a pipeline 31 by means of a fan 30 and is supplied, via pipeline 32, to pipeline 13 for the primary combustion air. The respective air quantities in chambers 7 to 11 are adjusted by means of control facilities 33 in the form of flaps or diaphragms which regulate the supply of the air-oxygen mixture to the individual chambers 7 to 11. Of course, every chamber 7 to 11 can have a separate oxygen pipeline so as to adjust the oxygen content of the primary air in individual chambers separately.

A video camera or thermographic camera 34, a monitor 35, a freely programmable computer 36 and a controller unit 37 are provided for controlling the combustion process. The video camera or thermographic camera 34 is aligned in such a way that it can observe the material 19 burning on the combustion grate 5 from above through the combustion chamber 14. The video camera is connected with the monitor 35 and the freely programmable computer 36 which resolves the received image appropriately and compares the obtained digital values and which represent a measurement of the brightness on the respective combustion zone, with predetermined standard values and, in the event of a deviation, initiates a corresponding control process via the controller unit 37 which adjusts the control devices 33 in the individual chambers 7 to 11, these control devices 33 being constructed as flaps or slides. The video camera 34 accordingly supplies values based on the received solid body radiation emanating from the combustion layer 19 which can be used to determine the temperature of the combustion layer 19. The amount of primary air is adjusted by adjusting control devices 33 and the oxygen content of the primary air is adjusted via the controller unit 37 by adjusting control device 38 in the pipeline 31. The amount of primary air and the oxygen content are adjusted as a function of the burning behavior of the combustion layer 19 on the combustion grate 5 in the respective monitored zone of the combustion grate.

In so doing, the distribution and the amount of primary air and, in particular, its oxygen content are dimensioned in such a way that the temperature value determined by the camera 34 and its distribution approximates as far as possible an optimal set value stored in the computer 36. As was already mentioned, it is endeavored to achieve the hottest possible combustion layer 19—principally above the main combustion zones 8 and 9—in order to achieve the most complete burning of gas and solids as possible. However, after a certain temperature which can only be determined empirically from the fuel waste, the incandescent mass on the combustion grate 5 begins to melt and accordingly leads in a compulsory manner to disruption of the grate mechanics. Accordingly, the object of the control device employed is to adjust the temperature value considered as optimal, e.g., 1,100° C. surface temperature of the solid fuel in the main combustion zone. Falling below this value results in the signal "higher oxygen concentration required in zones 8 and 9" or the total amount of combustion air is reduced in order to reduce the cooling effect by means of the ballast nitrogen in the air. The required amount of fresh air is given by adapting to the predetermined temperature values in the fuel combustion layer on the one hand and the desired $O_2$ content in the primary air on the other hand. This $O_2$ content in the primary air is preferably 35% by volume. This procedure is carried out in reverse when the reference temperature value is exceeded.

Since this control is preferably programmed in fuzzy logic, it must be based, for example, on the following algorithms:

1. When the temperature of the combustion layer is lower than the optimal combustion layer temperature and 1.1 if, at the same time, the concentration of oxygen in the primary air is lower than the concentration of the pre-set oxygen proportion, this results in the signal "more oxygen"

1.2 if, at the same time, the concentration of oxygen in the primary air is greater than the pre-set oxygen value, this results in the signal "less fresh air".

Thermocouple elements are provided in the region of the secondary combustion zone, only one thermocouple element 39 being shown in the drawing. The thermocouple element 39 serves to monitor the temperature in the secondary combustion zone and is connected with the freely programmable computer 36 which is connected in turn with the controller unit 37. This computer 36 adjusts, via the control devices 40 and 41, the amount of flue gas to be supplied to the secondary air nozzles 21 and 22 and, when appropriate, the amount of surrounding air which is adjusted via controlling device 41. When a pre-set temperature reference value is exceeded at the thermocouple element 39, the regulation causes the control device 40 to be opened farther and causes the control device 41 to be closed so that the proportion of returned flue gas increases and the temperature is reduced. Instead of using thermocouple elements 39, the temperature can also be measured by means of a sound pyrometer (pyrosonic) or by the laser-Doppler method. Instead of temperature measuring elements, it has proven particularly advantageous to use a flame detector which is installed at the same location as the thermocouple element 39. This flame detector looks horizontally into the flue gas flue 15 and can register the presence of actively burning flames. Since excessive flame length is undesirable because it indicates an incomplete combustion process and a risk of corrosion for the pipes of the steam generator 42, the secondary combustion region can also be regulated as follows: the chief object of regulation is to adjust the highest possible proportion of returned flue gas 28 so as to achieve a moderate secondary combustion reaction and minimize $NO_x$. Whenever the flame detector 39 indicates an active flame, the fresh air proportion 29 in the secondary air is increased and the recirculating gas quantity 28 is reduced. If no flame is detected, the regulator works in the opposite manner. It is optimal to replace the secondary air entirely by returned flue gas.

With the help of this control device and the corresponding monitors, it is possible to control, on the one hand, the intensive burning on the stoker grate by controlling the amount of primary air and the percentage of oxygen in the combustion air and, on the other, the behavior in the secondary combustion zone by adjusting the secondary air, which consists largely of recirculated flue gas. By these means, an excessive increase in the temperature in the secondary combustion region is avoided and the amount of gas passed through the installation as a whole, is reduced. In this connection, the reduction in the amount of gas is at a maximum, when no additional air is taken in from the surroundings. Compared to previously known incinerators, the amount of primary air is reduced owing to the fact that the oxygen content of the primary air is increased over that of the surrounding air and, with that, the percentage of nitrogen, which acts as a ballast, is decreased.

Figure 2:
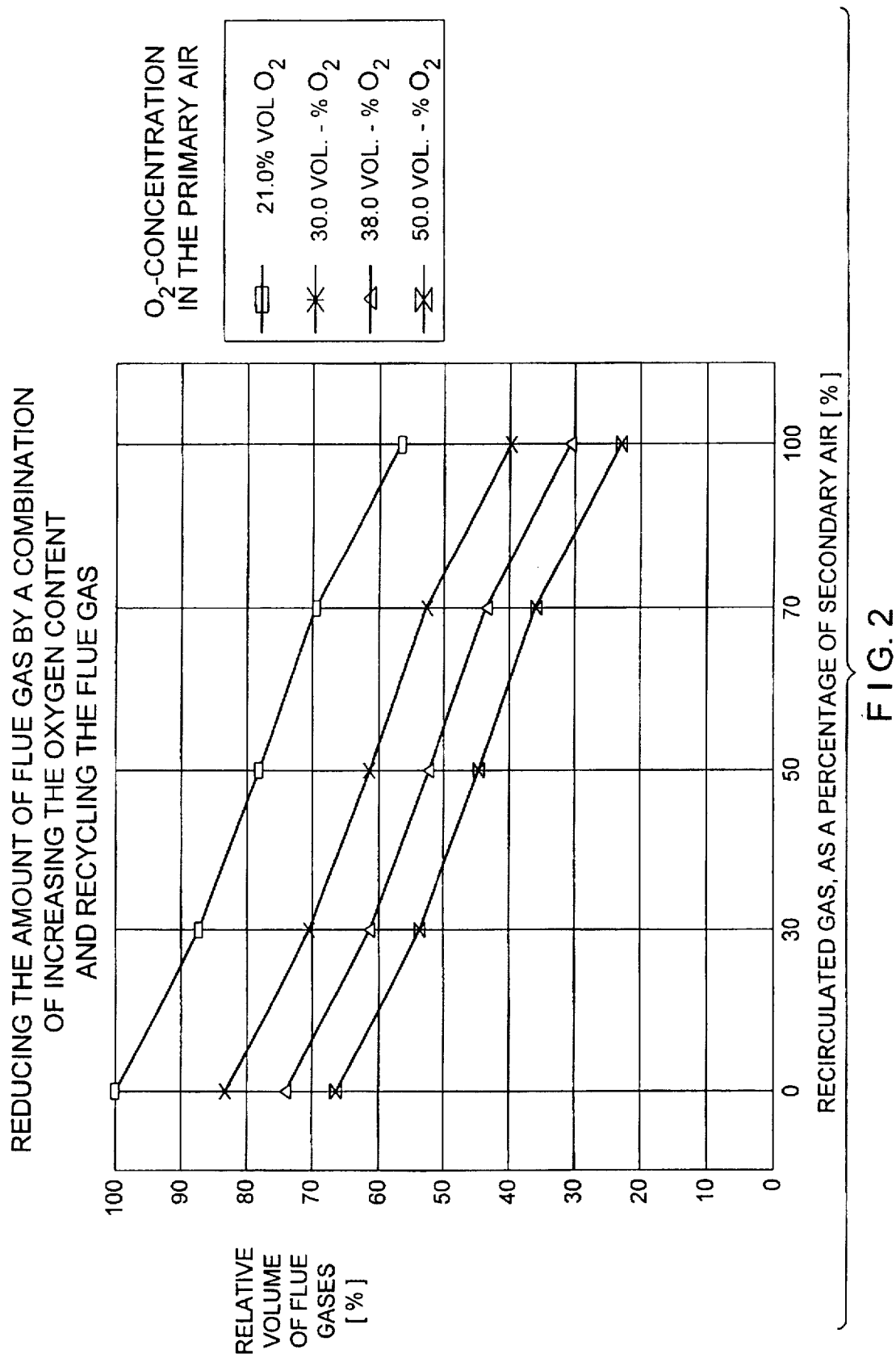
FIG. 2 shows a diagram relating to the reduction in the amount of flue gas at different oxygen concentrations in the primary air and different percentages of recirculation gas based on the amount of secondary air.

The diagram of FIG. 2 shows the achievable reduction in the amount of flue gas as a function of the oxygen concentration of the primary air on the one hand and the recirculated amount, as a percentage of the secondary air, on the other. The relative volume of flue gas is plotted from 0% to 100% on the abscissa and the recirculated amount, as a percentage of the secondary air, is plotted from 0% to 100% on the ordinate. The four curves drawn reproduce the reduction in the amount of flue gases as a function of the oxygen concentration of the primary air.

Various experimental results are assembled in FIGS. 3 to 6. To help with understanding these results, the formulas and abbreviations used there are explained below:

O2-Conc.=oxygen concentration $NO_x$-Conc.=nitrogen oxide concentration

HCL-Conc.=hydrogen chloride concentration $SO_2$-Conc.=sulfur dioxide concentration HF-Conc.=hydrogen fluoride concentration RGR=flue gas cleaning
PL=primary air
SKL=secondary air
Rezi-Anteil=recirculated amount, as a percentage of the secondary air
Lambda=air excess factor In all the experiments described below, the installation is charged with fuel consisting of garbage, the hourly amount charged and the calorific value being kept constant in all experiments, so that the effects of the inventive measures become clear under constant starting conditions with respect to the fuel.

In all the experiment diagrams, the amounts of garbage charged hourly and the calorific value are given in field a and the amount of primary air, the primary air as a percentage of the total combustion air, the lambda value, the oxygen concentration in the primary air and the percentage of flue gas recirculated are given in field b. The amount of flue gas arising in the grate region, the oxygen concentration and the concentration of the important pollutants are listed in field c. The amount of and the oxygen concentration in the secondary air are given in field d. The amount of flue gas, the oxygen concentration in the flue gas, as well as the amounts of the different pollutants are given in field e. The amount of flue gas flowing through the boiler, the air excess factor measured in the boiler, the oxygen concentration as well as the concentrations of the different pollutants in mg/Nm$^3$ are assembled in field f. The amount of flue gas, the oxygen concentration as well as the concentrations of the different pollutants, in each case before and after the flue gas cleaning, are assembled in fields g and h. The pollutant loadings in g/h, which leave the chimney after the cleaning of the flue gas, are given in field i. Below field i, the reduction in the amount of flue gases is given as a percentage.

Figure 3A:
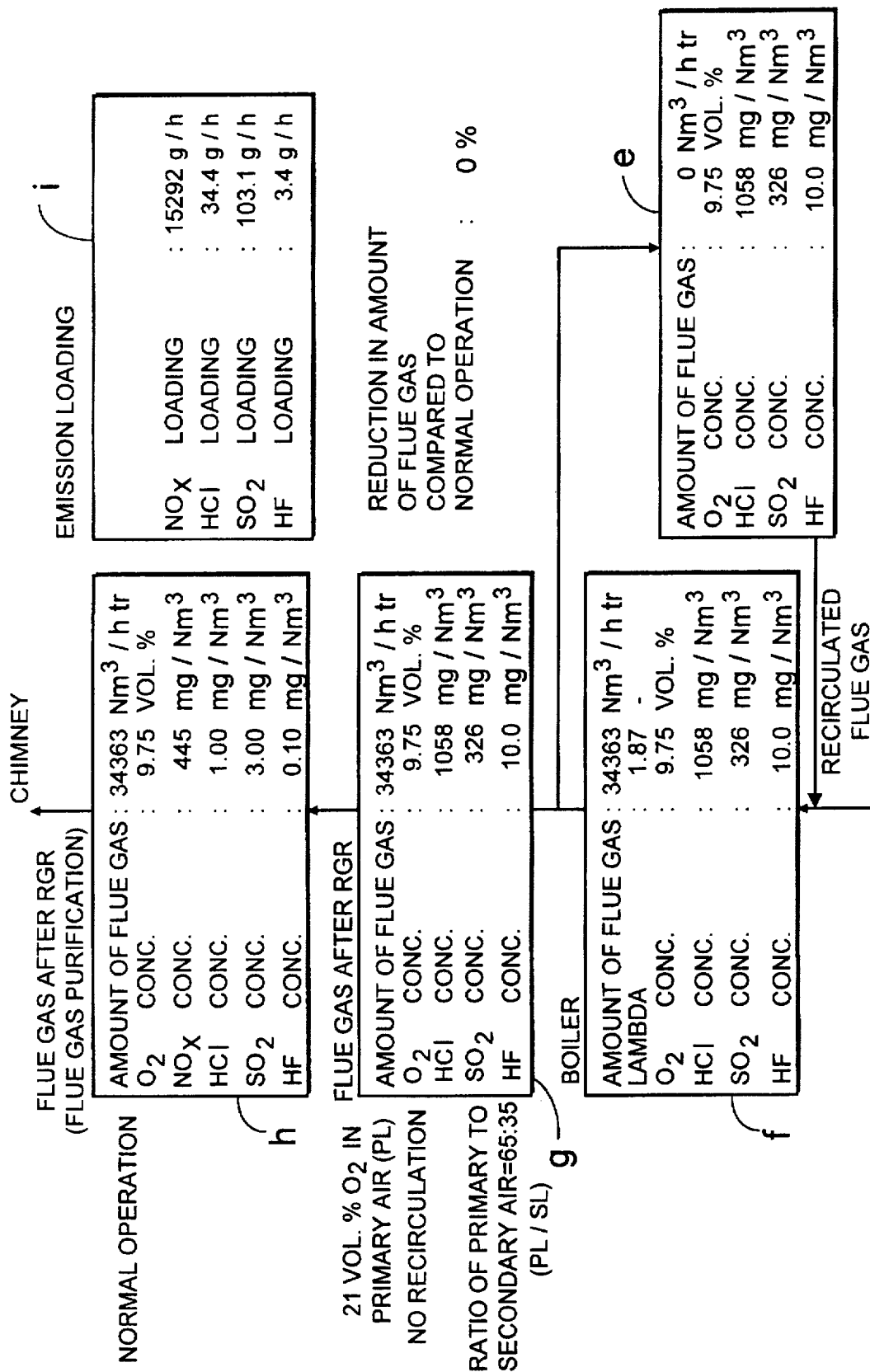
FIG. 3 shows an experimental result from the operation of a furnace using outside air as primary air and without any recirculation of the flue gases into the secondary air.
Figure 3B:
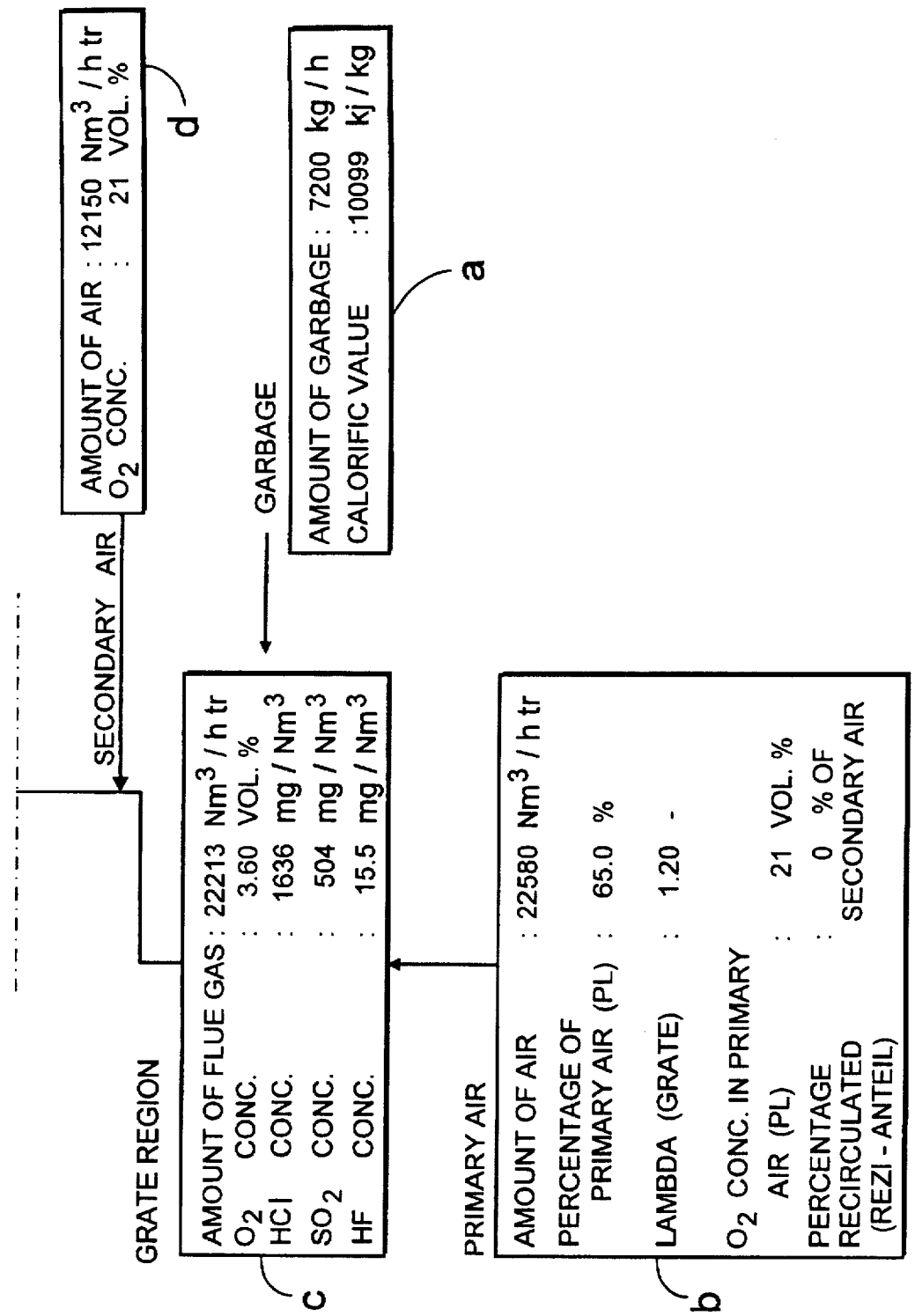

The experimental results during the normal operation of an incinerator are given in FIG. 3. During this normal operation, the incinerator is operated with normal outside air as primary air and with normal outside air as secondary air. The ratio of primary air to secondary air is 65:35. Since normal outside air is used for the secondary air, there is no recirculation of flue gas.

In the first experiment, which is summarized in FIG. 3, the normal operation is reproduced. The achievable reductions in the amounts of flue gas as a percentage compared to normal operation and the pollutant loads arising as important results of the inventive combustion process are given in FIGS. 3 and 4.

Figure 4A:
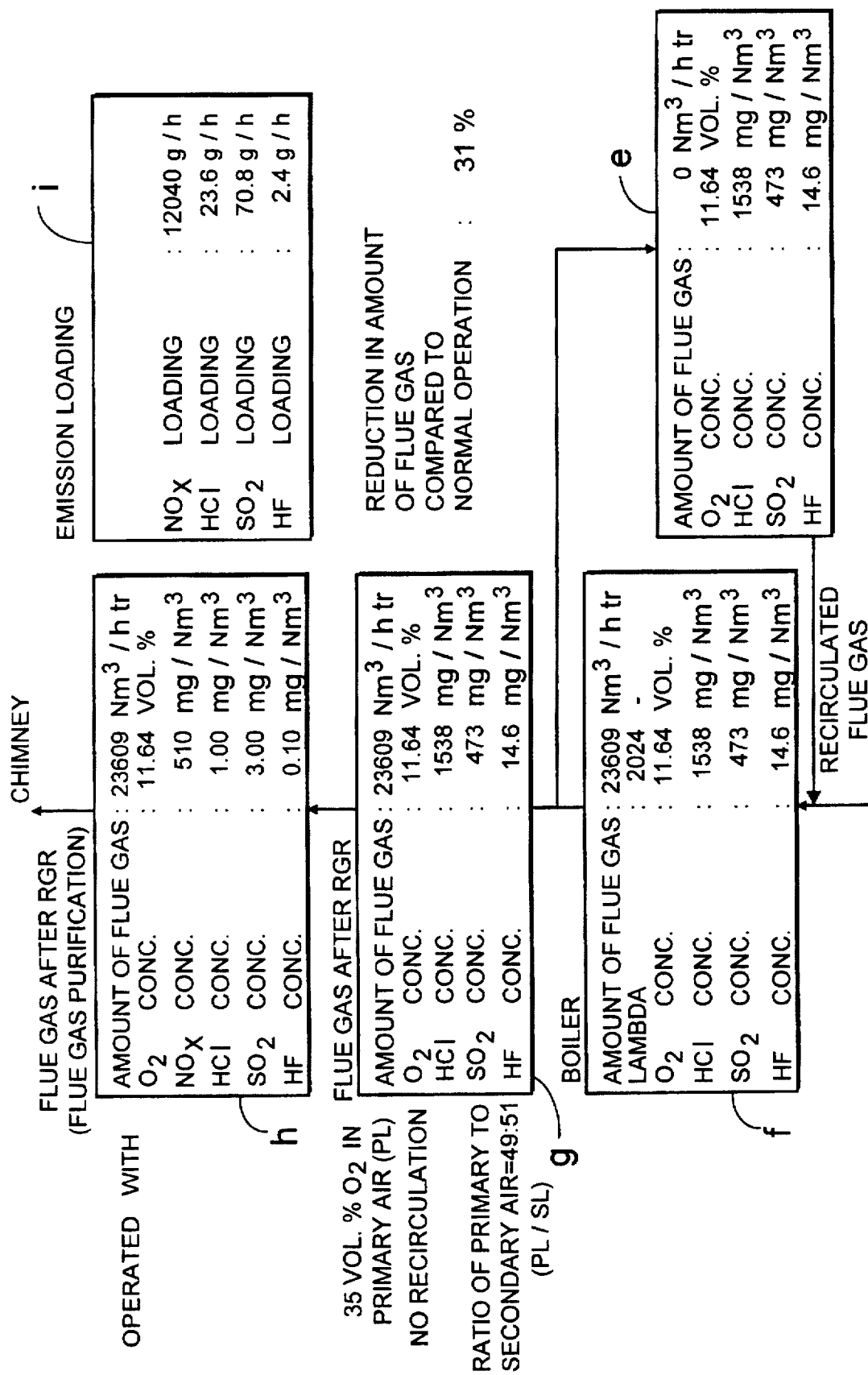
FIG. 4 shows an experimental result from the operation of a furnace with an oxygen concentration of 35% by volume without any recirculation of the flue gases.
Figure 4B:
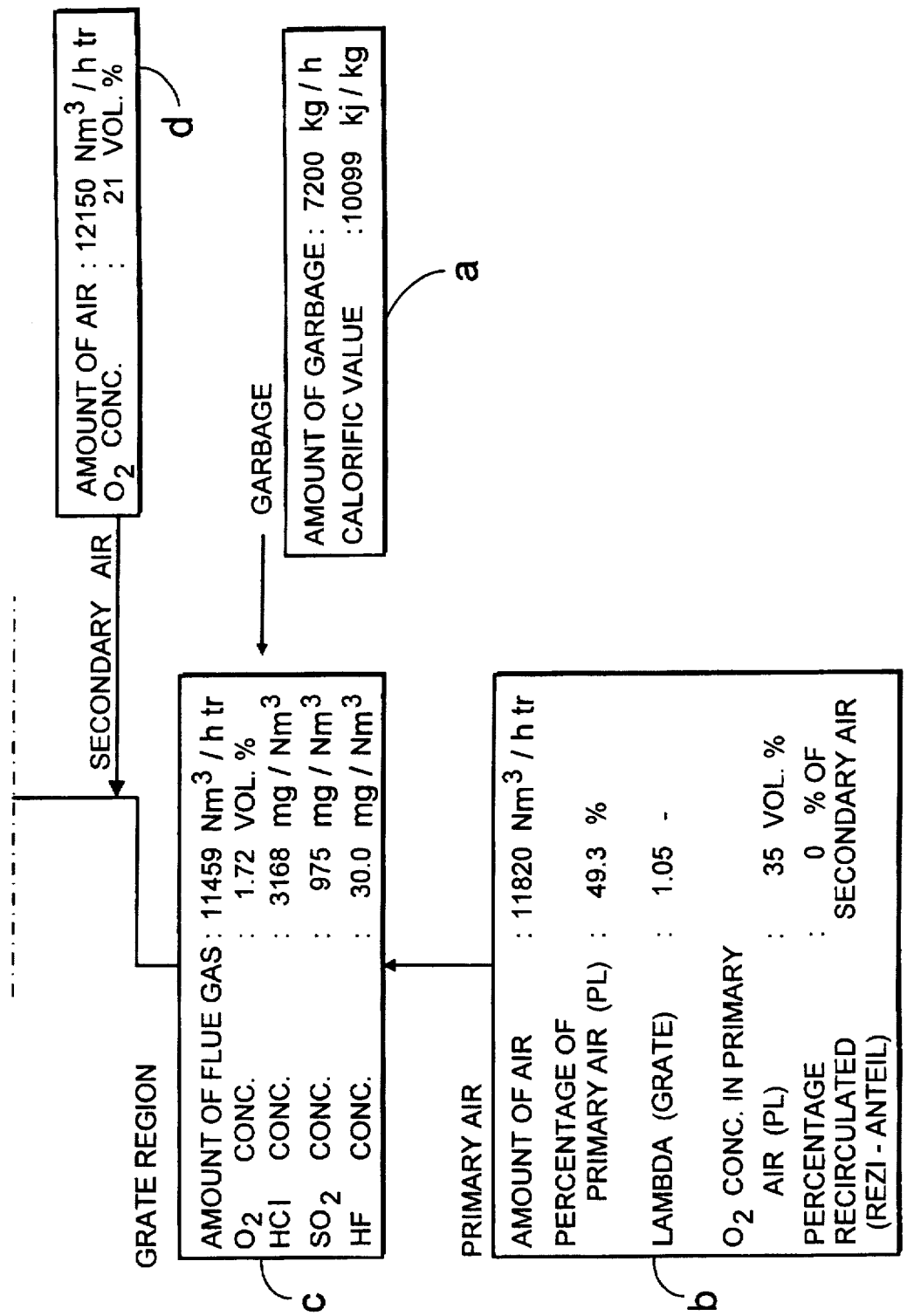

For the experimental results given in FIG. 4, the installation was operated with an oxygen content of 35% by volume in the primary air, a ratio of primary air to secondary air of 49.3:50.7 without recirculation of the flue gas, normal outside air being used for the secondary air. Compared to the normal operation of FIG. 3, it was possible to achieve a reduction of 31% in the amount of flue gas. Compared to the normal operation, it was possible to reduce appreciably the pollutant loading of oxidizable pollutants leaving the chimney every hour, as is evident from a comparison of the numbers given in field i. On the other hand, the proportion of NO$_x$ increased slightly in comparison to FIG. 3. This can be attributed to the increased oxygen content in the primary air. However, the NO$_x$ loading is less because of the decreased amount of flue gas.

Figure 5A:
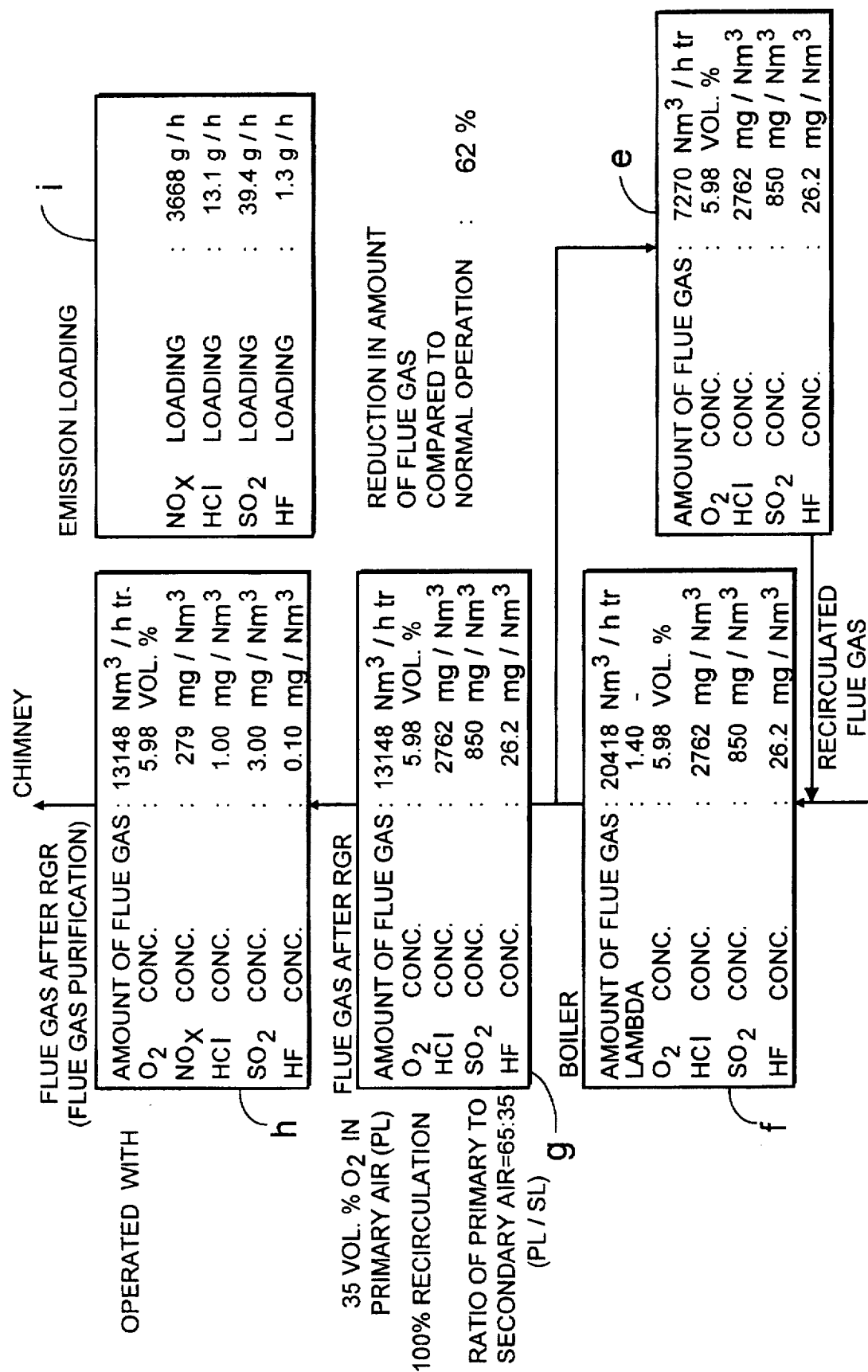
FIG. 5 shows an experimental result from the operation of a furnace with an oxygen concentration of 35% by volume in the primary air and complete recirculation of the flue gases.
Figure 5B:
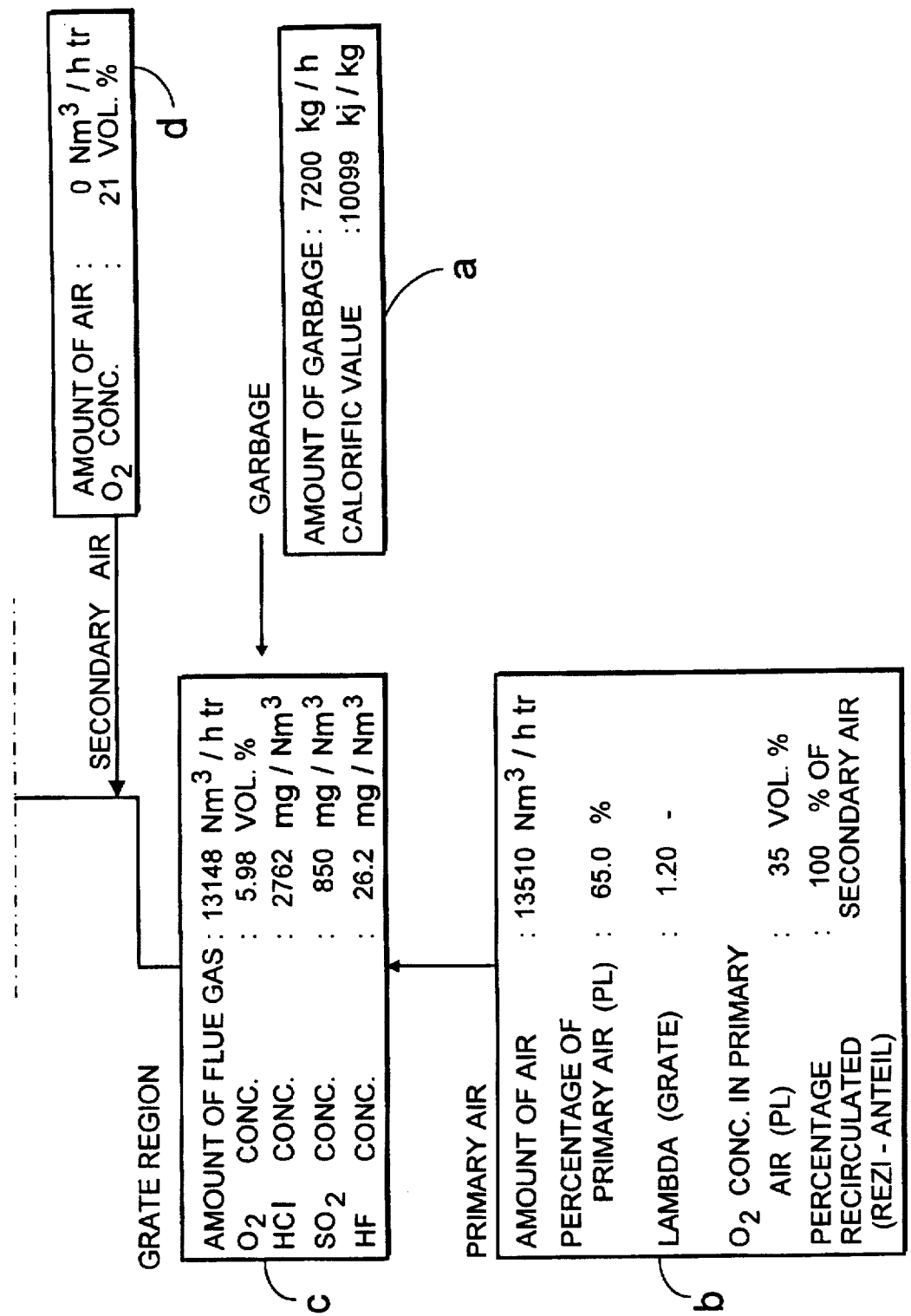

From a further experimental result assembled in FIG. 5, a decrease in the amount of flue gas of 62% compared to the normal operation and a further drastic reduction of the pollutant loading leaving the chimney can be observed. For this, the installation was operated with an oxygen content of 35% by volume in the primary air, a ratio of primary air to secondary air of 65:35 and a recirculation of 100%. The great reduction in the portion of NO$_x$ despite the high oxygen percentage in the primary air can be attributed to the damping measures achieved by recirculating the flue gas.

Figure 6A:
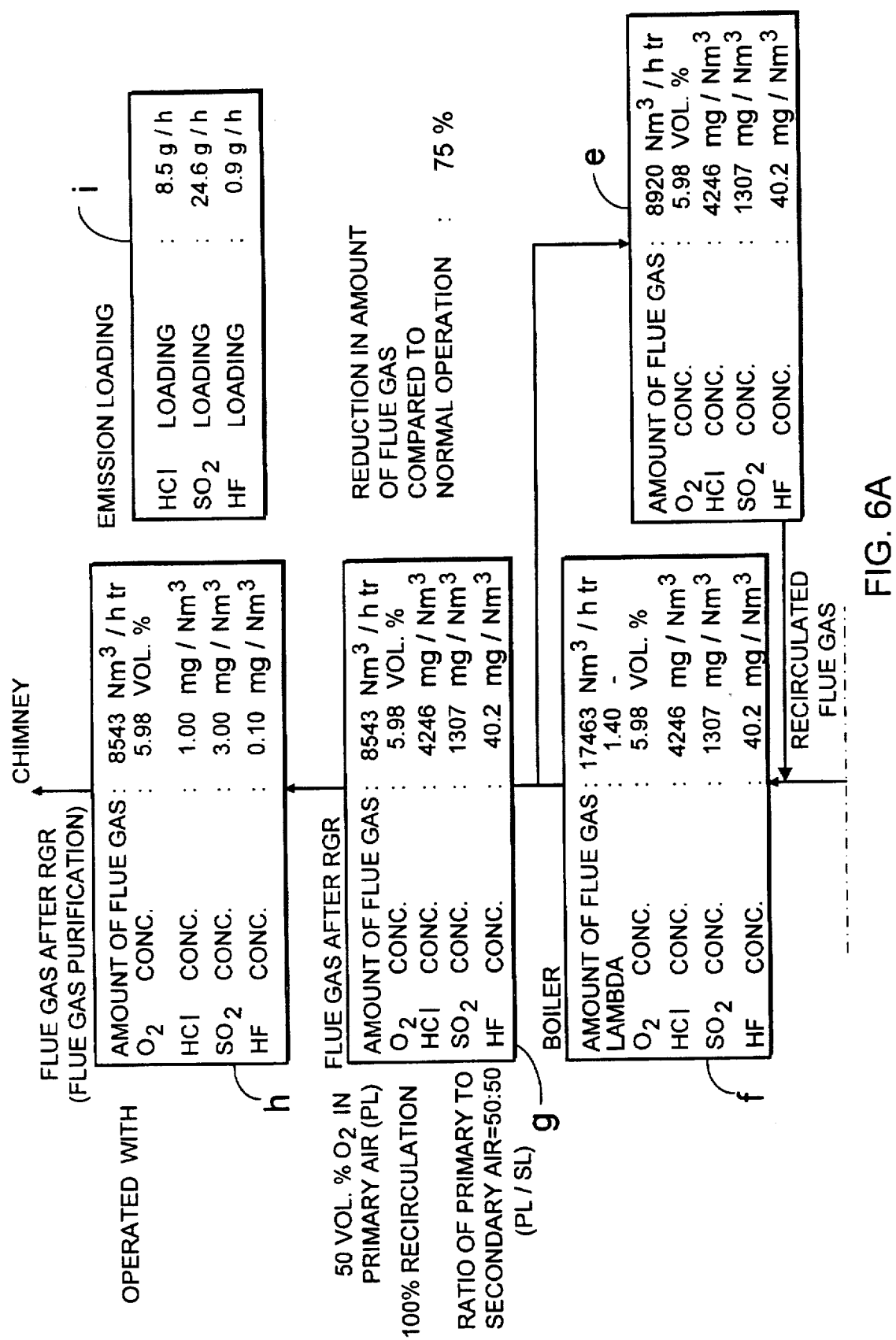
FIG. 6 shows an experimental result from the operation of a furnace with an oxygen concentration of 50% by volume in the primary air and 100% recirculation of the flue gases.
Figure 6B:
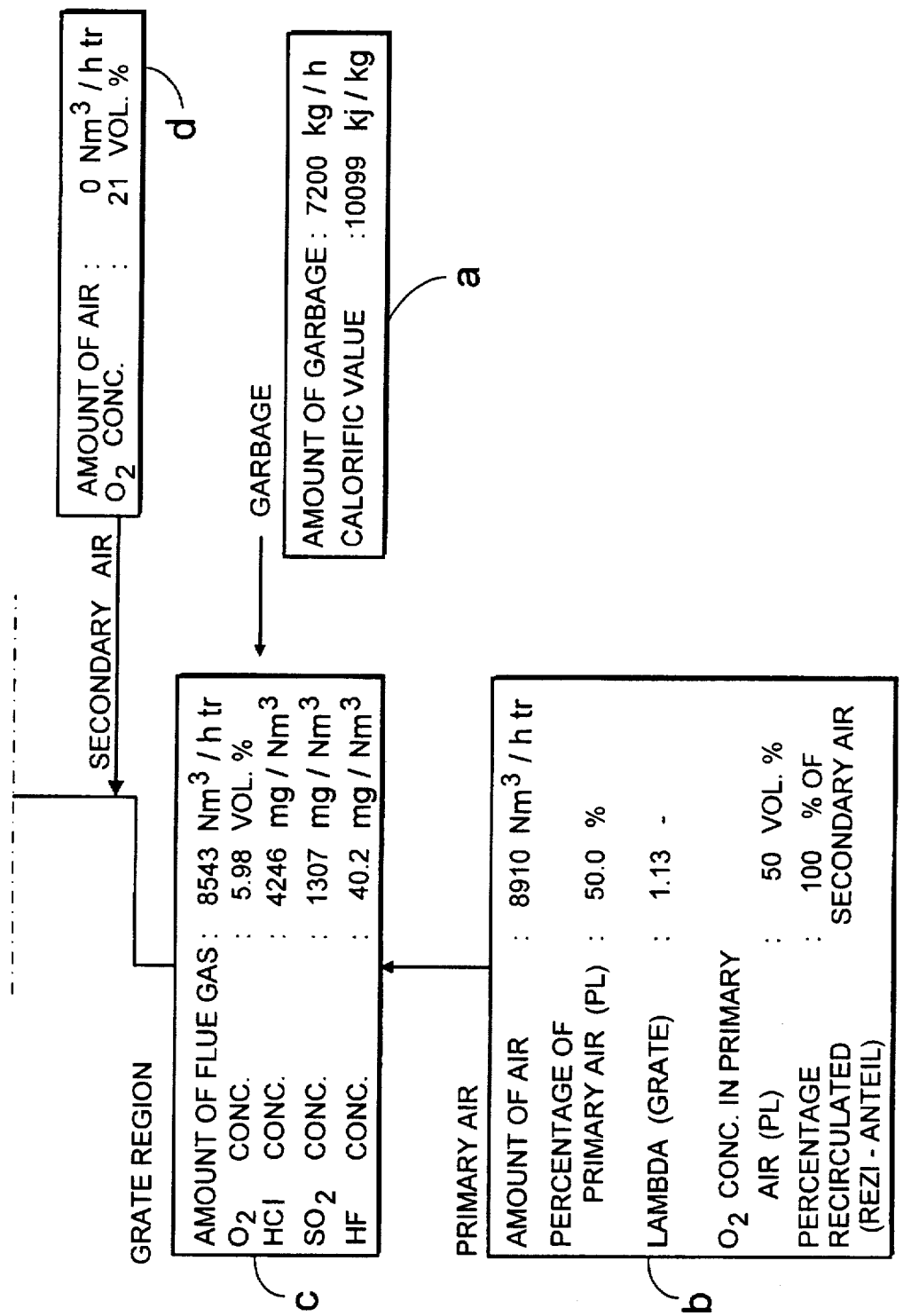

For the experiment recorded in FIG. 6, the installation was operated with an oxygen concentration of 50% by volume in the primary air, a ratio of primary air to secondary air of 50:50 and with 100% recirculation. A reduction in the amount of flue gas of 75% compared to normal operation was achieved. If the pollutant loading of this experiment, given in field i, is compared with that of the normal operation given in FIG. 3, it is observed that the HCl loading has decreased from 34.4 g/h to 8.5 g/h; this corresponds to a decrease of about 75% compared to the normal operation. For the other pollutant loadings, the reduction is also around 75% compared to the normal operation. In other words, not only is the amount of flue gas in the experiment of FIG. 6 reduced by 75% compared to that of a normal operation, but a correspondingly high reduction in the pollutant loading has also been achieved. If the pollutant concentrations in the flue gas after the cleaning of the flue gas, for example in the case of the experiment of FIG. 3, that is, of a normal operation, and the pollutant concentration in the experiment of FIG. 6 are considered, these values in each case being given in field h, it is noted that the values are identical, whereas the corresponding values before the cleaning of the flue gas, based on the standard cubic meter of flue gas, are almost four times as high in the experiment of FIG. 6 than in the experiment of FIG. 3, that is, during normal operation. From this it can be seen that, due to the reduction in the amount of flue gas and based on the standard cubic meter of flue gas, there is a significantly higher, that is, about four times as high a concentration of pollutants in the flue gas before the cleaning of the flue gas. As a result, this flue gases offers significantly better preconditions, for example, for the recovery of hydrochloric acid and gypsum than does the flue gas from normal operations. For normal operations, the expenditure for equipment is very high if hydrochloric acid and gypsum are to be recovered starting out from the relatively low concentrations of these pollutants.

While the foregoing description and drawings represent the preferred embodiments of the present invention, it will be obvious to those skilled in the art that various changes and modifications may be made therein without departing from the true spirit and scope of the present invention.

What is claimed is:

1. In a method for burning fuels in incinerators with a stoker grate, for which primary air is supplied into a fuel layer from below the stoker grate and secondary air is supplied above the fuel layer, the improvement comprising the steps of:

increasing the intensity of combustion of the fuels on the stoker grate at least partially by increasing the percentage of oxygen in the primary air, so that the surface temperature of the fuel lies in the range of 800° C.–1,200° C.; and choking the intensity of combustion in a secondary combustion zone by decreasing the percentage of oxygen in the secondary air, so that the temperature in the secondary combustion zone lies in the range 800° C.–1, 100° C., the decreasing of the percentage of oxygen in the secondary air being accomplished by using recirculated flue gas in the secondary air.

2. The method of claim 1, including the steps of:

increasing the oxygen content of the primary air locally, beyond the oxygen content of surrounding air, as a function of a factor selected from of the group of factors consisting of burning behavior and combustion intensity of the fuel layer on the stoker grate, and decreasing the oxygen content of the secondary air below the oxygen content of the surrounding air by admixing recirculated flue gas and adjusting the secondary air locally with respect to composition, amount, place at which the secondary air is supplied and with respect to a high turbulence in the secondary combustion zone so that the formation of nitrogen oxides above the fuel layer is minimized.

3. The method of claim 1, including the step of increasing the oxygen content of the primary air only in a main combustion zone of the stroker grate.

4. The method of claim 1, including the step of adjusting the oxygen content of the primary air to 25% to 50% by volume.

5. The method of claim 4, including, in said adjusting step, adjusting the oxygen content of the primary air to approximately 35% by volume of oxygen.

6. The method of claim 1, wherein, in said flue gas recirculation step, recirculating flue gases which constitute 20% to 65% of the total amount of air and gas supplied to effect the combustion.

7. The method of claim 6, wherein, in said flue gas recirculation step, recirculating flue gases which constitute approximately 35% of the total amount of air and gas supplied to effect the combustion.

8. The method of claim 1, further including the step of adjusting the oxygen content of the primary combustion air as a function of the surface temperature of the material being burned.

9. The method of claim 1, further including the step of adjusting the oxygen content of the secondary air as a function of the temperature in the secondary combustion zone.

10. The method of claim 1, further including the step of adjusting the oxygen content in the secondary air as a function of the length of the flame in the vertical direction in a combustion chamber.

11. The method of claim 1, including the step of drawing off the recirculated flue gas after it has passed through a boiler.

12. The method of claim 1, including the step of drawing off the recirculated flue gas immediately above the fuel layer.

13. In a process for the combustion of fuels in a combustion installation with a grate furnace in which primary air is supplied below the grate furnace in a fuel bed and secondary air is supplied above the fuel bed, the improvement comprising:

increasing a combustion intensity of fuel on the furnace grate at least in some areas of the furnace grate by increasing a proportion of oxygen in the primary air to 25–50 vol. % with a resulting percentagewise reduction in a proportion of nitrogen in the primary air relative to surrounding air; and above the fuel bed after oxidizable pollutants are eliminated, choking a combustion intensity of a secondary combustion zone by reducing a proportion of oxygen in the secondary air relative to the surrounding air by recirculating flue gas, wherein the recirculated flue gas makes up 20–65% of a total amount of air and gas supplied above the fuel bed.

14. Process according to claim 13 wherein the oxygen content of the primary air is increased in a localized manner relative to the oxygen content of the surrounding air, depending on a burnup behavior and combustion intensity of the fuel bed located on the furnace grate, the secondary air being adjusted in a localized manner with respect to composition, quantity, supply location, and a high turbulence in the secondary combustion zone in such a way that the formation of nitrogen oxides above the fuel bed is largely prevented.

15. Process according to claim 13 wherein the oxygen content of the primary air is increased only in a main combustion zone of a primary combustion zone of the grate furnace.

16. Process according to claim 13 wherein the oxygen content of the primary air is adjusted depending on the surface temperature of the fuel.

17. Process according to claim 13 wherein the oxygen content of the secondary air is adjusted depending on the temperature in the secondary combustion zone.

18. Process according to claim 13 wherein the oxygen content of the secondary air is adjusted depending on flame length in a vertical space of the combustion installation.

19. Process according to claim 13 wherein flue gas to be recirculated is sucked out after flowing through a boiler.

20. Process according to claim 13 wherein flue gas to be recirculated is sucked out directly above the fuel bed.

* * * * *

UNITED STATES PATENT AND TRADEMARK OFFICE
CERTIFICATE OF CORRECTION

PATENT NO.     : 5,762,008
ISSUED         : June 9, 1998
INVENTOR(S)    : Johannes J.E. Martin et al It is certified that this error appears in the above-identified patent and that said Letters Patent is hereby corrected as shown below:

Column 13, line 14, change "stroker" to --stoker--.

Signed and Sealed this

Third Day of November, 1998

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,762,008  Page 1 of 3
DATED : May 9, 1995
INVENTOR(S) : Johannes Josef Edmund Martin, et al It is certified that error appears in the above-identified patent and that said Letters Patent is hereby corrected as shown below:

Delete Drawing Sheet 1 of 10 and substitute therefor the Drawing Sheet, consisting of Figure 10, as shown on the attached pages.

Title page, showing an illustrative figure, should be deleted and substitute therefor the attached title page.

Signed and Sealed this

Twelfth Day of January, 1999

Attest:

*Attesting Officer*   *Acting Commissioner of Patents and Trademarks*

United States Patent [19]

Martin et al.

[11] Patent Number: 5,762,008
[45] Date of Patent: Jun. 9, 1998

[54] BURNING FUELS, PARTICULARLY FOR INCINERATING GARBAGE

[75] Inventors: Johannes Josef Edmund Martin; Joachim Horn, both of Munich; Michael Busch, Rosenheim, all of Germany

[73] Assignee: Martin GmbH fuer Umwelt- und Enetgietechnik, Munich, Germany

[21] Appl. No.: 437,785
[22] Filed: May 9, 1995

Related U.S. Application Data

[63] Continuation-in-part of Ser. No. 229,919, Apr. 19, 1994, abandoned.

[30] Foreign Application Priority Data

Apr. 20, 1993 [DE] Germany .......................... 43 12 820.3

[51] Int. Cl.[6] .................................................. F23J 11/00
[52] U.S. Cl. .......................... 110/345; 110/348; 110/204; 110/248; 110/300
[58] Field of Search .............................. 110/348, 345, 110/346, 203, 204, 245, 248, 205

[56] References Cited

U.S. PATENT DOCUMENTS

| 5,241,916 | 9/1993 | Martin | 110/204 X |
| 5,307,746 | 5/1994 | Khinkis et al. | 110/345 X |
| 5,405,537 | 4/1995 | Goff et al. | 110/346 X |

Primary Examiner—Henry A. Bennett
Assistant Examiner—Susanne C. Tinker
Attorney, Agent, or Firm—McAulay Fisher Nissen Goldberg & Kiel, LLP

[57] ABSTRACT

A method for burning fuels, particularly garbage, in incinerators with a stoker grate, for which the primary air is supplied below the stoker grate into the fuel layer and the secondary air is supplied above the fuel layer, is controlled in such a way that the intensity of the combustion of the fuel on the stoker grate is increased by increasing the oxygen content of the primary air and the intensity of the combustion in the secondary combustion zone is choked by decreasing the oxygen content in the secondary air. Flue gas, preferably from the combustion process, is recirculated in order to reduce the oxygen content of the secondary air.

20 Claims, 10 Drawing Sheets

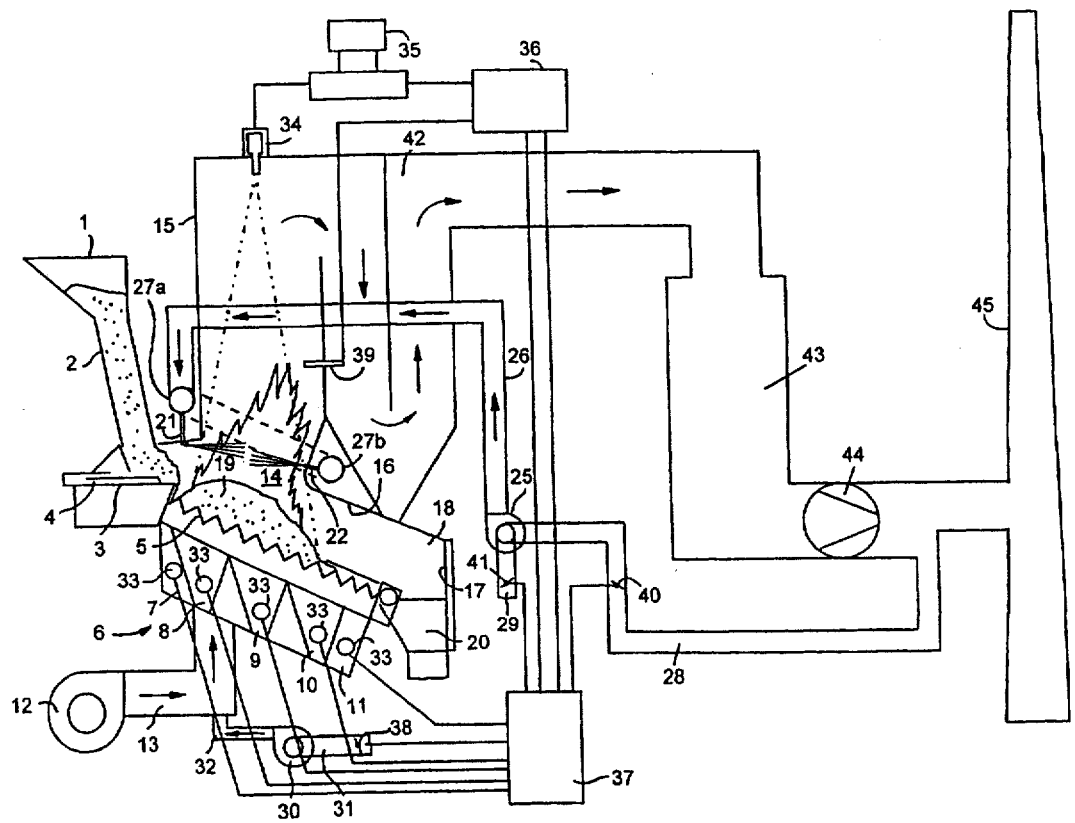

UNITED STATES PATENT AND TRADEMARK OFFICE
CERTIFICATE OF CORRECTION

PATENT NO. : 5,762,008
DATED : May 9, 1995
INVENTOR(S) : Johannes Josef Edmund Martin, et al Page 3 of 3

It is certified that error appears in the above-identified patent and that said Letters Patent is hereby corrected as shown below:

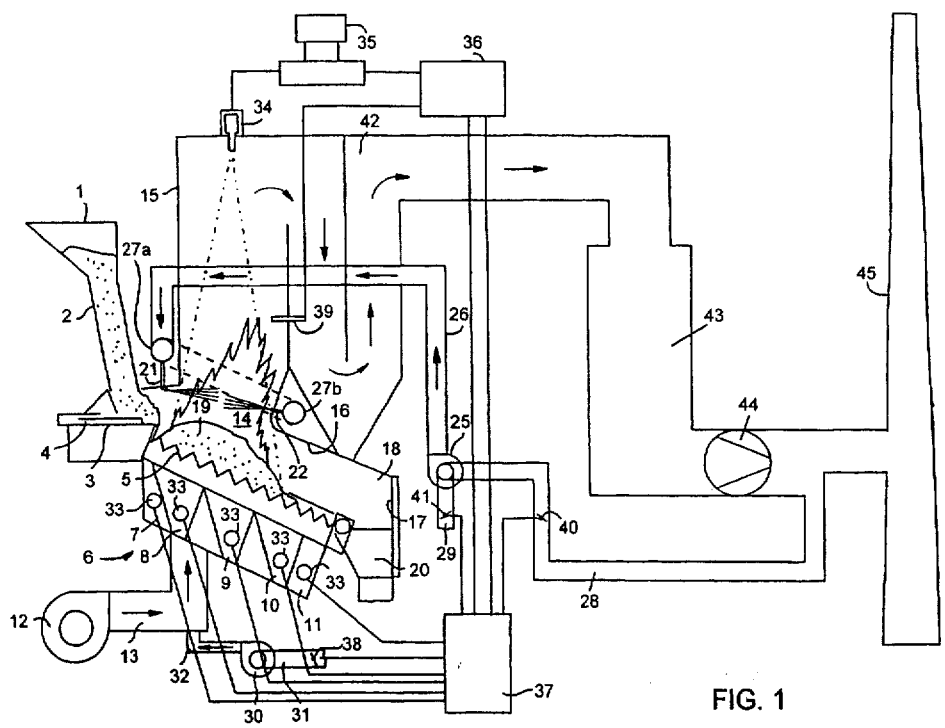

FIG. 1